US010774940B2

(12) United States Patent
Naor et al.

(10) Patent No.: US 10,774,940 B2
(45) Date of Patent: Sep. 15, 2020

(54) DIAPHRAGM VALVE AND DIAPHRAGM THEREFOR

(71) Applicant: Dorot Management Control Valves Ltd., Kibbutz Dorot (IL)

(72) Inventors: Giora Naor, Kibbutz Bror Hail (IL); Alexei Aven, Ashdod (IL)

(73) Assignee: DOROT MANAGEMENT CONTROL VALVES LTD., Kibbutz Dorot (IL)

( * ) Notice: Subject to any disclaimer, the term of this patent is extended or adjusted under 35 U.S.C. 154(b) by 53 days.

(21) Appl. No.: 16/308,472

(22) PCT Filed: Jun. 5, 2017

(86) PCT No.: PCT/IL2017/050625
§ 371 (c)(1),
(2) Date: Dec. 9, 2018

(87) PCT Pub. No.: WO2017/212481
PCT Pub. Date: Dec. 14, 2017

(65) Prior Publication Data
US 2019/0257438 A1   Aug. 22, 2019

(30) Foreign Application Priority Data

Jun. 9, 2016  (IL) .......................................... 246151

(51) Int. Cl.
*F16K 7/02* (2006.01)
*F16K 31/126* (2006.01)
(Continued)

(52) U.S. Cl.
CPC .......... *F16K 27/0236* (2013.01); *F16K 7/126* (2013.01); *F16K 31/1262* (2013.01); *F16K 31/1264* (2013.01); *F16K 31/1266* (2013.01)

(58) Field of Classification Search
CPC .. F16K 27/0236; F16K 7/126; F16K 31/1266; F16K 31/1264
(Continued)

(56) References Cited

U.S. PATENT DOCUMENTS 2,186,833 A * 1/1940 Iler ......................... F16K 7/126
251/268
2,716,017 A   8/1955 Linker
(Continued)

FOREIGN PATENT DOCUMENTS

CA      1051407 A    3/1979
DE      1023283 B    1/1958
(Continued)

*Primary Examiner* — Kevin L Lee
(74) *Attorney, Agent, or Firm* — Dorsey & Whitney LLP

(57) ABSTRACT

A fluid control valve is provided, comprising a valve body configured with an inlet port extending into an inlet chamber, and an outlet port extending from an outlet chamber. The inlet and outlet chambers are partitioned by a sealing bridge. A control chamber accommodates a flexible sealing diaphragm deformable between a sealing position in which it sealingly bears over the sealing bridge and seals a fluid flow path extending between the inlet and outlet chambers, and an open position in which fluid flow along the flow path is enabled. An inlet path along the fluid flow path is longer than an outlet path therealong. An inlet radii of the sealing diaphragm is longer than an outlet radii of the sealing diaphragm.

20 Claims, 16 Drawing Sheets

(51) Int. Cl.
  *F16K 27/02* (2006.01)
  *F16K 7/12* (2006.01)

(58) Field of Classification Search
  USPC .......................................................... 251/331
  See application file for complete search history.

(56) References Cited

U.S. PATENT DOCUMENTS

| | | | |
|---|---|---|---|
| 2,874,930 | A | 2/1959 | Ray et al. |
| 2,880,961 | A | 4/1959 | Wynn |
| 2,936,998 | A | 5/1960 | Loepsinger |
| 3,310,280 | A | 3/1967 | Boteler |
| 3,426,999 | A * | 2/1969 | Toinet ............... F16K 7/126 251/331 |
| 3,719,343 | A | 3/1973 | Werra |
| 4,214,604 | A | 7/1980 | Rumsey |
| 4,301,992 | A | 11/1981 | Karbo |
| 5,383,646 | A | 1/1995 | Weingarten |
| 6,109,296 | A * | 8/2000 | Austin ............... F16K 31/1266 137/488 |
| 7,527,241 | B2 | 5/2009 | Lodolo |
| 8,945,484 | B2 | 2/2015 | Namkoong et al. |
| 9,046,180 | B2 | 6/2015 | Matalon |
| 9,587,750 | B2 * | 3/2017 | Ringer et al. ......... F16K 7/126 |
| 2006/0118751 | A1 | 6/2006 | Lodolo |
| 2007/0120086 | A1 | 5/2007 | Yoshino et al. |
| 2010/0071776 | A1 | 3/2010 | Ringer et al. |
| 2012/0039770 | A1 | 2/2012 | Namkoong et al. |
| 2014/0224348 | A1 | 8/2014 | Wopper et al. |
| 2014/0264104 | A1 | 9/2014 | Ringer et al. |

FOREIGN PATENT DOCUMENTS

| | | |
|---|---|---|
| DE | 976108 C | 2/1963 |
| DE | 10153362 A1 | 5/2003 |
| DE | 10223824 A1 | 12/2003 |
| EP | 99945 A1 | 2/1984 |
| EP | 928917 B1 | 4/2002 |
| GB | 624576 A | 6/1949 |
| GB | 732201 A | 6/1955 |
| GB | 743144 A | 1/1956 |
| GB | 806745 A | 12/1958 |
| GB | 896998 A | 5/1962 |
| GB | 926129 A | 5/1963 |
| JP | 61061379 A2 | 4/1986 |
| JP | 2006112562 A | 4/2006 |
| KR | 101607145 B1 | 3/2016 |
| WO | 9711726 A1 | 4/1997 |
| WO | 9923402 A1 | 5/1999 |
| WO | 04005778 A1 | 1/2004 |
| WO | 05052419 A1 | 6/2005 |
| WO | 05069816 A2 | 8/2005 |
| WO | 07093492 A1 | 8/2007 |
| WO | 07104332 A1 | 9/2007 |
| WO | 08051871 A2 | 5/2008 |
| WO | 10112313 A1 | 10/2010 |
| WO | 11054061 A1 | 5/2011 |
| WO | 13135366 A1 | 9/2013 |
| WO | 14151971 A1 | 9/2014 |
| WO | 15181709 A1 | 12/2015 |

\* cited by examiner

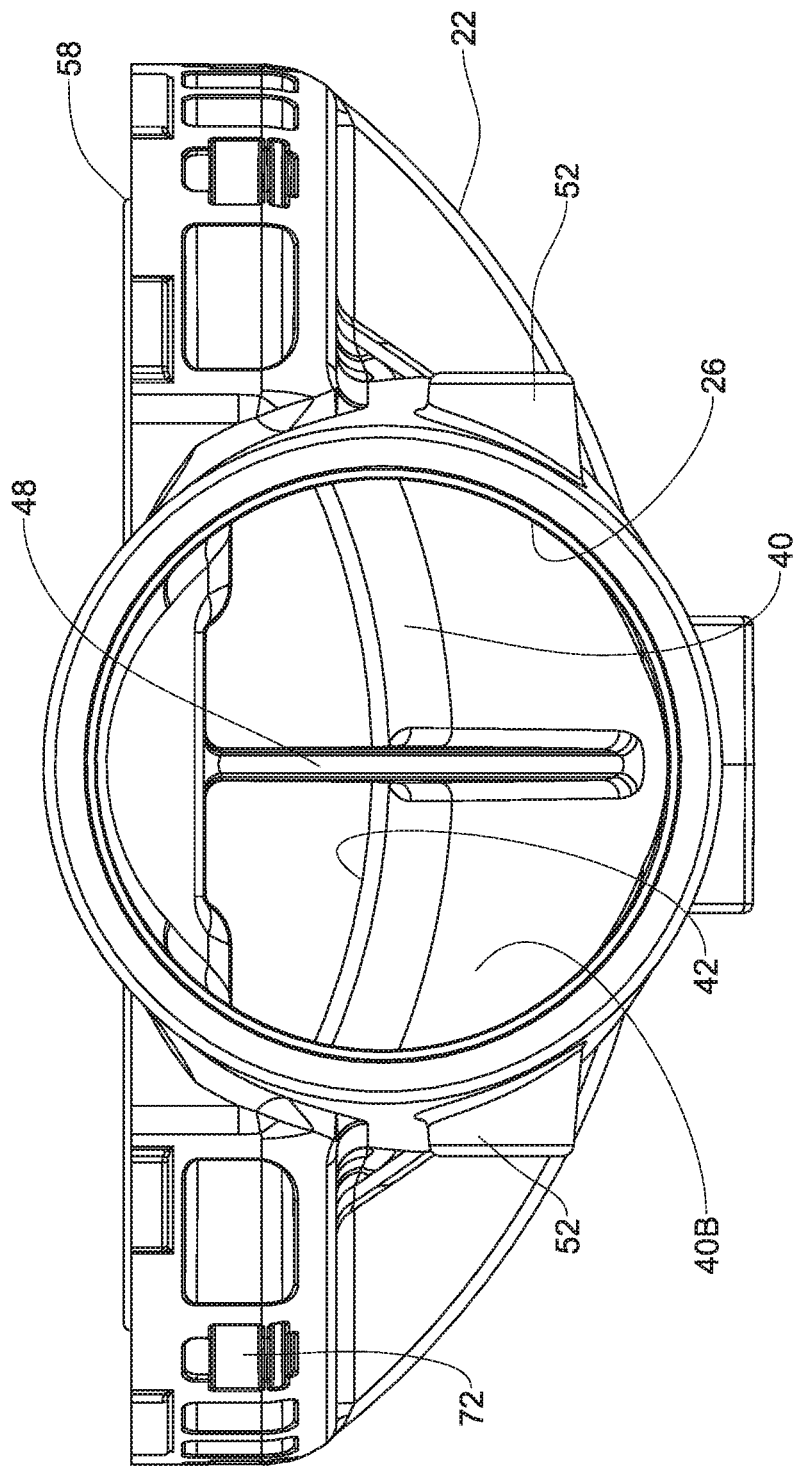

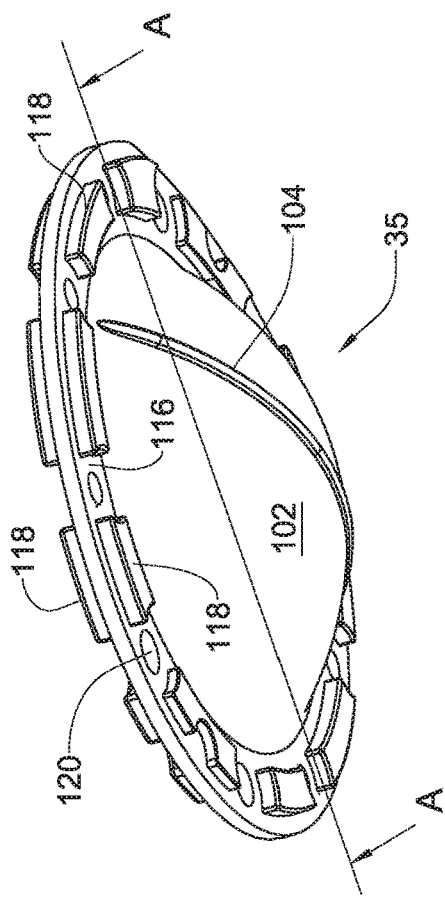
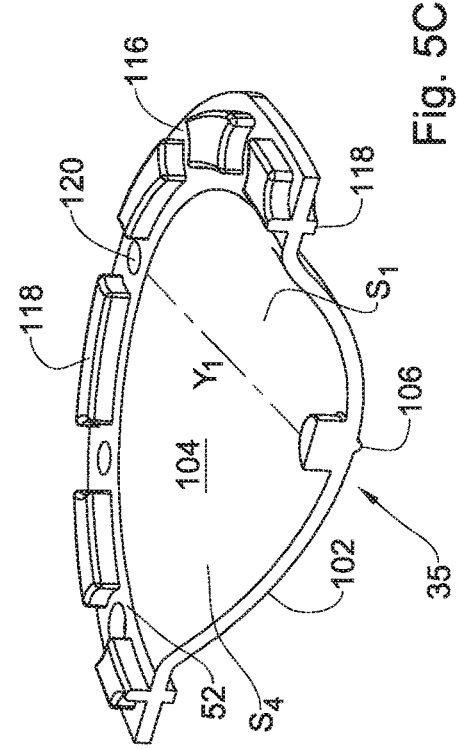
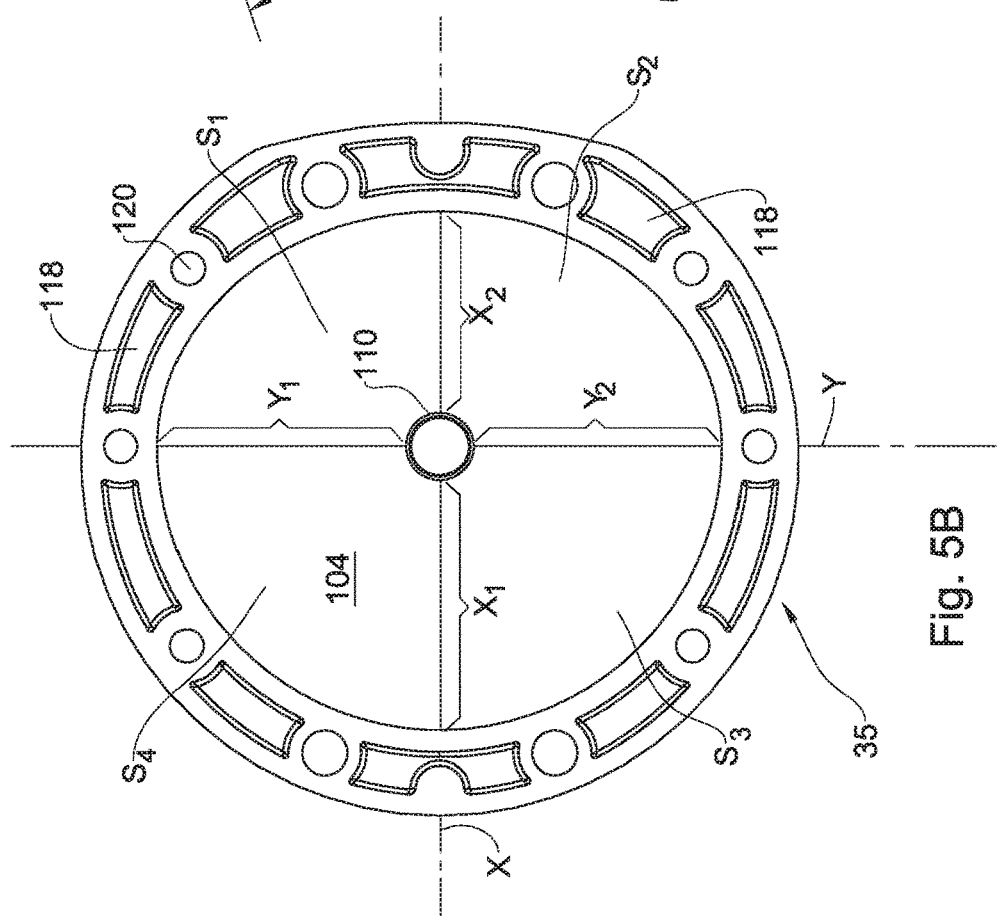
Fig. 5A
Fig. 5C
Fig. 5B

DIAPHRAGM VALVE AND DIAPHRAGM THEREFOR

CROSS-REFERENCE TO RELATED APPLICATIONS

This application is a U.S. National Phase Application under 35 U.S.C. 371 of International Application No. PCT/IL2017/050625, which has an international filing date of Jun. 5, 2017, and which claims priority and benefit from Israel Patent Application No. 246151, filed Jun. 9, 2016, the contents and disclosure of both of which are incorporated herein by reference in their entirety.

TECHNOLOGICAL FIELD

The present disclosure concerns a flow control diaphragm valve and a diaphragm therefor. More particularly is directed to a diaphragm valve configured with an elongate sealing bridge.

BACKGROUND

U.S. Pat. No. 7,527,241 discloses a diaphragm valve having an inlet sleeve and an outlet sleeve that converge to a fluid flow chamber contains a valve seat engaged by an elastic diaphragm that is composed of a peripheral flange connected to a central dome-shaped part. The cross section of the two sleeves near the valve seat is flattened in the direction of flow and elongated in the direction transverse thereto, so to form a substantially elliptical port, corresponding to the dome of the diaphragm, which has the shape of a sector of an ellipsoid. Acknowledgement of the above reference herein is not to be inferred as meaning that these are in any way relevant to the patentability of the presently disclosed subject matter.

SUMMARY

A first aspect of the disclosure is directed to a fluid control valve comprising a valve body configured with an inlet port extending into an inlet chamber, and an outlet port extending from an outlet chamber, wherein the inlet chamber and the outlet chamber are partitioned by a sealing bridge; a control chamber accommodating a flexible sealing diaphragm deformable between a sealing position in which it sealingly bears over the sealing bridge and seals a fluid flow path extending between the inlet chamber and the outlet chamber, and an open position in which fluid flow along the flow path is enabled; and wherein an inlet path along the fluid flow path is longer than an outlet path along the fluid flow path. Likewise, an inlet radii of the sealing diaphragm is longer than an outlet radii of the sealing diaphragm. This arrangement results in that the diaphragm can be disposed into its open position also at significantly low pressure differentials and likewise, drifting of the diaphragm into the outlet chamber is more unlikely to occur.

The arrangement is such that an effective section area of the inlet chamber is significantly greater than an effective section area of the outlet chamber. The surface area at a bottom face of the diaphragm, at the inlet chamber, is balanced with a top surface area of the diaphragm.

The control chamber extends between a body cover and the diaphragm, said body cover being sealingly articulated to the valve body, with one or more control inlet ports and one or more control outlet ports extending into said control chamber, for coupling thereto a hydraulic/pneumatic command line, whereby the diaphragm can be deformed into its sealing position.

A control inlet port can be coupled to the inlet port of the valve body for pressurizing the control chamber, and a control outlet port can be coupled to the outlet port of the valve body for drainage of control liquid from the control chamber. Alternatively the control outlet port can be extend directly to the atmosphere for drainage.

An inside face of the body cover can be configured with a diaphragm bearing surface for supporting the flexible diaphragm when it its open position. According to a particular configuration the diaphragm bearing surface is formed by a plurality of neighboring ribs. The ribs can be radially disposed and shaped so as to support the flexible diaphragm and prevent it from excessive deforming.

The flexible diaphragm can be clamped between a diaphragm seat at the valve body and a clamping portion at the body cover.

One or more of the clamping portion of the body cover and the diaphragm seat of the valve body and an clamping portion of the diaphragm can be configured with griping projections with corresponding apertures configured at an opposite mating face, according to one particular example the annular clamping portion of the flexible diaphragm is configured with a plurality of projections extending at a top and bottom face thereof, with corresponding griping openings formed in register at the clamping portion of the body cover and the diaphragm seat of the valve body.

Sealing between the flexible diaphragm and the valve body and the valve cover can be obtained by configuring a sealing member at either or both the annular clamping portion of the flexible diaphragm and the respective clamping portion of the body cover and the diaphragm seat of the valve body.

A second aspect of the present disclosure is directed to a diaphragm seal for a diaphragm valve, the diaphragm seal being made of a resilient material and having an asymmetric shape.

The diaphragm has a generally round and domed shape encircled by a peripheral clamping portion, wherein the domed shape is a symmetric along a flow axis thereof extending along a flow direction between an inlet side and an outlet side thereof.

Yet an aspect of the present disclosure is directed to a valve body configured with a diaphragm seat having a funnel-like diaphragm seat portion extending into a top portion of an inlet chamber and outlet chamber of the valve, with a corresponding rounded clamping portion at a body cover, whereby a diaphragm is clamped also below a clamping flange thereof.

Any one or more of the following features, designs and configurations, can be implemented in a fluid control valve and a diaphragm valve therefor, according to the present disclosure, individually or in various combinations thereof:

An inlet path along a flow axis of the valve diaphragm is longer than an outlet path of the flow axis of the valve diaphragm;

A section area of an inlet chamber of the valve housing is greater than a section area of an outlet chamber;

An inlet radii of the diaphragm is substantially similar to a sealing radii of the diaphragm along a sealing portion thereof, namely a radii perpendicular to said inlet radii;

A length measured along the sealing bridge is substantially similar to a double length of the inlet chamber. According to a particular example the sealing bridge is extends about a diameter;

The sealing bridge can be configured with a concave section;

A sealing portion of the sealing bridge can be configured with a flat sealing surface;

A sealing portion of the sealing bridge can be configured with a projecting rib for sealing engagement with the flexible diaphragm;

The flexible diaphragm can be configured at a bottom face thereof with a sealing rib for sealing engagement with the sealing bridge of the valve body;

The inlet chamber and the outlet chamber can be configured with a hydrodynamic shape for substantially reducing hydrodynamic drag of liquid flow;

A liquid flow path widens between the inlet port and the inlet chamber;

A liquid flow path narrows between the outlet chamber and the outlet port;

The inlet port and the outlet port are substantially coaxially disposed;

The outlet chamber can be configured with a diaphragm support configured to prevent drifting of the diaphragm into the outlet chamber (i.e., buckling of the diaphragm inwards into the outlet chamber);

The diaphragm support can be coaxial with a longitudinal axis of the outlet port;

The sealing diaphragm can be biased into a normally sealed position;

Biasing the sealing diaphragm into its normally sealed position can be facilitated by a spring member;

The biasing spring member can be a coiled spring bearing at one end against a valve body cover and at an opposite end against the sealing diaphragm;

The biasing member can be mechanically restricted to prevent displacement of the diaphragm into its fully open position, to thereby restrict fluid flow through the valve and reduce fluid flow pressure. A mechanical restriction mechanism can comprise a displacing member configured for bearing at a top portion of the biasing member and configured for displacing said top portion of the biasing member from a bottom face of the valve cover. According to one particular example, the mechanical restriction mechanism comprises a plate element bearing at a top portion of the biasing member, said plate member configured for axial displacement by a bolt member projecting from the cover;

The valve body and the body cover can be made of plastic material;

The valve body and the body cover can be made of metal;

The body cover can be secured to the valve body with a plurality of bolts, said bolts fastened to nuts or inserts received at the valve body;

Nuts can be received within drawer-like nut receiving openings;

The flexible diaphragm can be configured with an annular clamping flange;

The annular clamping flange can be configured with reinforcing elements extending from said annular flange;

The annular clamping flange can be configured with sealing ribs extending from said annular flange and;

The diaphragm seat can be configured with a funnel-like diaphragm seat portion extending into a top portion of the inlet chamber and outlet chamber, with a corresponding rounded clamping portion at the body cover, whereby the diaphragm is clamped also below a clamping flange thereof. This arrangement increases the effective diaphragm clamping area and improves sealing efficiency as the sealing location of the diaphragm is nearer to an apex of the sealing bridge. Furthermore, this arrangement improves flow characteristics of the valve;

The valve can be a double operated diaphragm valve comprising a valve body configured with an inlet port extending into a first inlet chamber and into a second inlet chamber, an outlet port extending from a first outlet chamber and a second outlet chamber, wherein the first inlet chamber and the first outlet chamber are partitioned by a first sealing bridge, and the second inlet chamber and the second outlet chamber are partitioned by a second sealing bridge, a first control chamber accommodating a first flexible sealing diaphragm and a second control chamber accommodating a second flexible sealing diaphragm, said first diaphragm and second diaphragm being deformable between a sealing position in which they sealingly bear over a respective sealing bridge and seal a fluid flow path extending between the respective inlet chamber and the outlet chamber, and an open position in which fluid flow along the flow path is enabled; and wherein an inlet path along the fluid flow path is longer than an outlet path along the fluid flow path. According to a particular configuration the first sealing bridge and the second sealing bridge are parallel to one another and the sealing diaphragms are coaxially displaceable, however at opposite senses, when displacing into their respective closed or open position. The two diaphragms simultaneously displace into their respective closed or open position;

The arrangement according to the double operated diaphragm valve is such that substantially high fluid flow rates can pass thru the valve;

The inlet port and the outlet port can extend coaxially or be disposed at an angle with respect to one another. According to one example the inlet port and the outlet port are angularly disposed with respect to one another, however coplanar extending over a substantially vertical plane. According to yet an example said plane is substantially a horizontal plane. The inlet port and the outlet port can extend from the valve body at an equally angled orientation, or they can be each disposed at a different angle with respect to the body housing.

BRIEF DESCRIPTION OF THE DRAWINGS

In order to better understand the subject matter that is disclosed herein and to exemplify how it may be carried out in practice, examples will now be described, by way of non-limiting examples only, with reference to the accompanying drawings, in which:

FIG. 3B is a side view of the valve body, taken from an outlet side thereof;

FIG. 5A is a bottom perspective view of a flexible diaphragm of the valve, at its non-deformed, closed position;

FIG. 5B is a top planar view of the diaphragm of FIG. 5A;

FIG. 5C is a section of the diaphragm, taken along line A-A in FIG. 5A;

DETAILED DESCRIPTION

Figure 1:
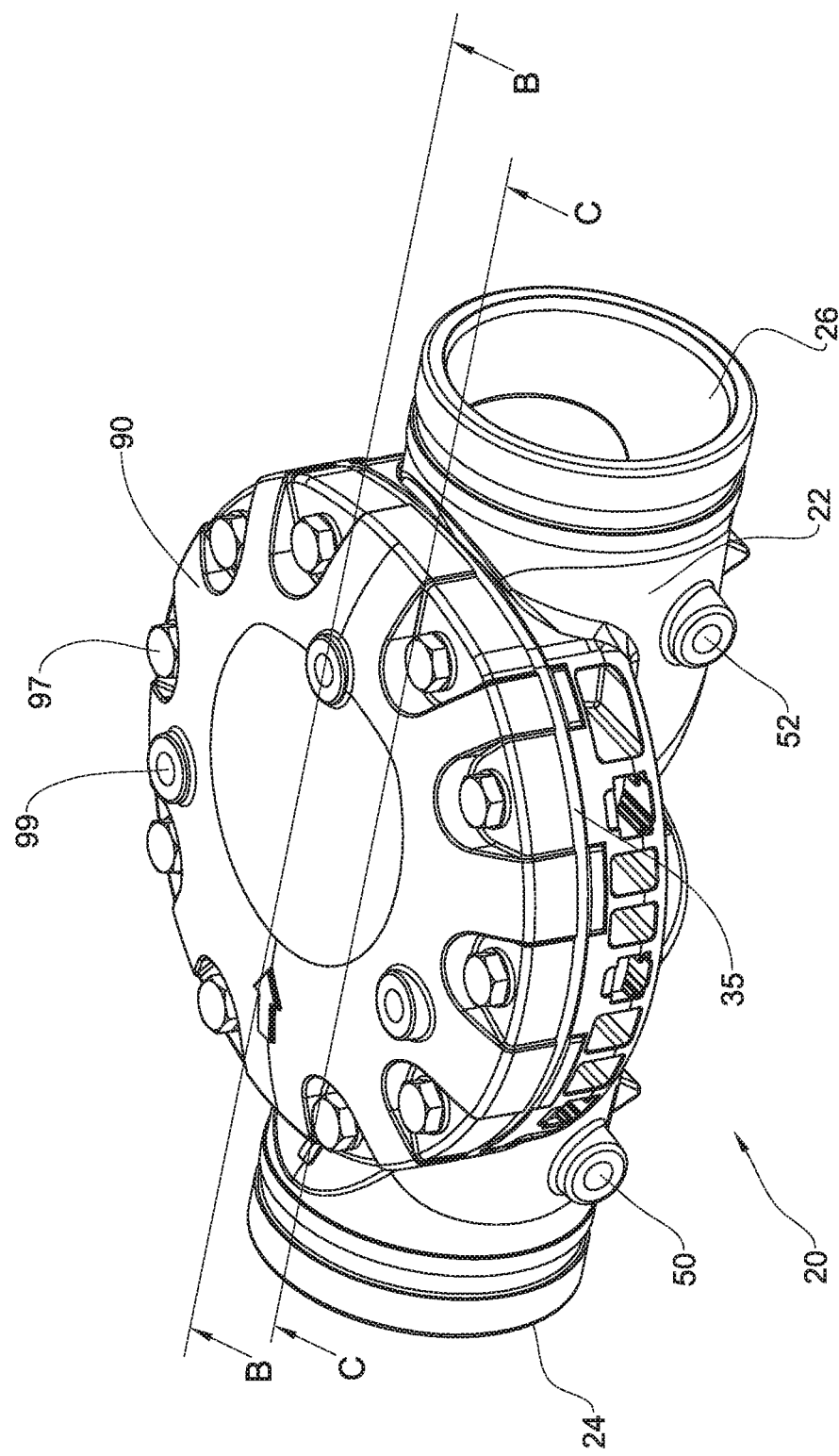
FIG. 1 is top perspective view of a valve according to an example of the present disclosure.

Attention is directed to the drawings 1 to 7, illustrating a flow control valve generally designated 20, according to an example of the present disclosure. The valve 20 comprises a valve body 22 with an inlet port 24 and a coaxially extending outlet port 26, where in the illustrated example said inlet port 24 and outlet port 26 are of similar cross section.

The inlet port 24 extends into an inlet chamber 30, and the outlet port extends from an outlet chamber 32, with a partitioning valve seat 40 disposed therebetween, said partition wall extending substantially normal to the flow path extending between the inlet port and the outlet port, with a concave sealing surface 42. It is noted that the inlet chamber 30 has a greater section area than the outlet chamber 32, and further it is noted that the inlet chamber 30 and the outlet chamber 32 are of greater section than the respective inlet port 24 and outlet port 26.

Also appreciated, the inlet chamber 30 and the outlet chamber 32 are both configured with hydrodynamic wall surfaces, i.e., wall surfaces 30A, 30B and 30C of the inlet chamber 30, and wall surfaces 32A, 32B and 32C of the outlet chamber 32, as well as wall surfaces 40A and 40B of the partitioning valve seat 40

The outlet chamber 32 is further configured with a diaphragm support wall 48 axially extending from the partitioning valve seat 40, and configured to prevent drifting of the flexible diaphragm 35 (discussed hereinafter in detail) into the outlet chamber (i.e., buckling of the diaphragm inwards into the outlet chamber).

The inlet port 24 is further configured with a pair of selective operable control inlet ports 50 for selective coupling thereto a control inlet line (not shown) for pressurizing a control chamber of the valve (discussed hereinafter), and the outlet port 26 is configures with a pair of selective control ports 52 optionally for coupling thereto draining ports (not shown) for drainage of control liquid from the control chamber.

As can further be seen, the valve body 22 is configured with an annular diaphragm seat 58, comprising an annular sealing rib 60 and a plurality of differently shaped radial depressions 64 (the purpose of which will be realized hereinafter) and bolt openings 66. Several of the bolt openings accommodate threaded screw inserts 70, whilst other bolt openings extended to a nut drawer 72 accommodating a nut 74. It is well seen that the diaphragm seat 58 is substantially planar and extends into the valve cambers (inlet chamber 30 and outlet chamber 32) via an annular funnel-like surface 78.

Figure 2:
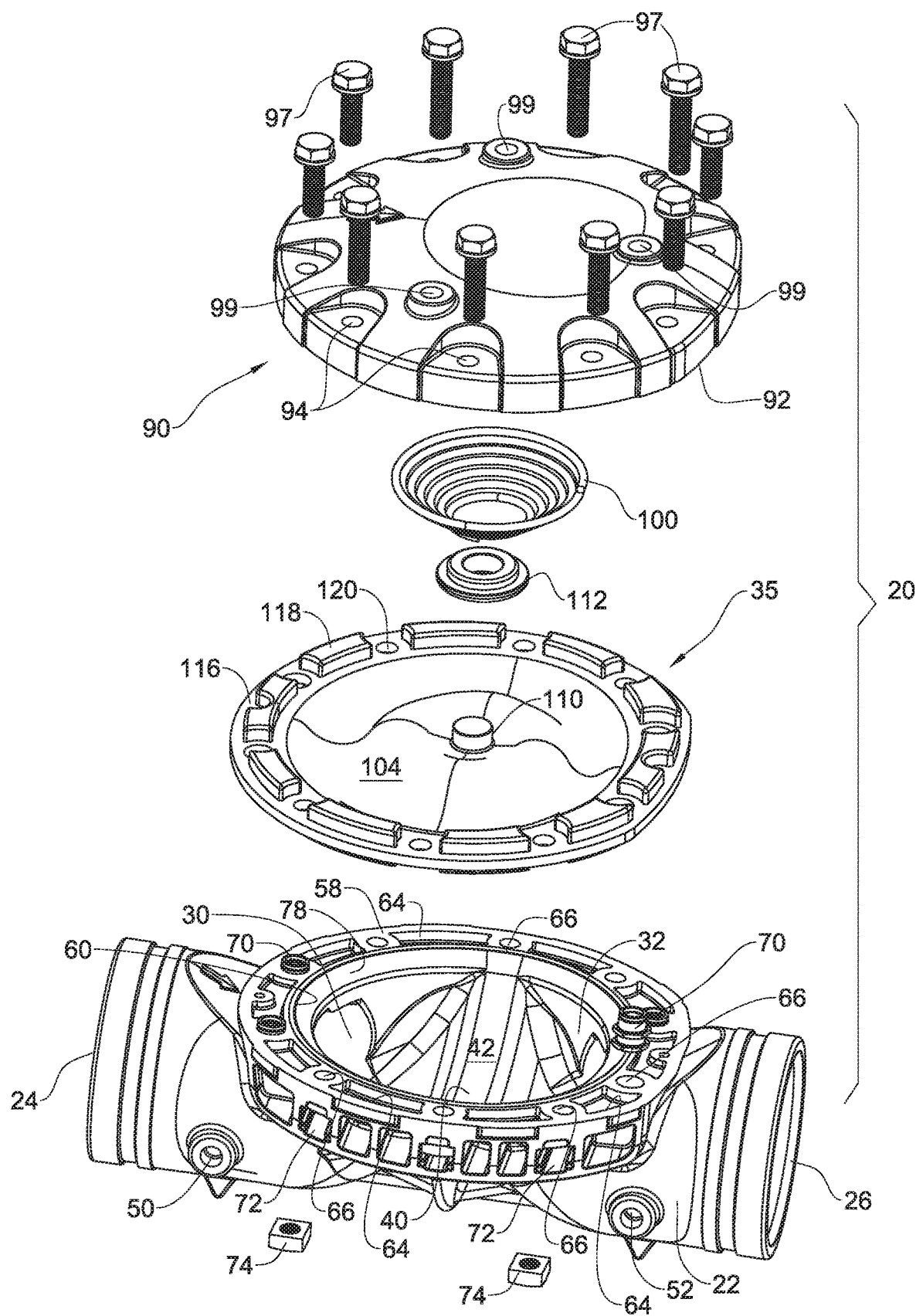
FIG. 2 is an exploded view of the valve of FIG. 1.
Figure 3A:
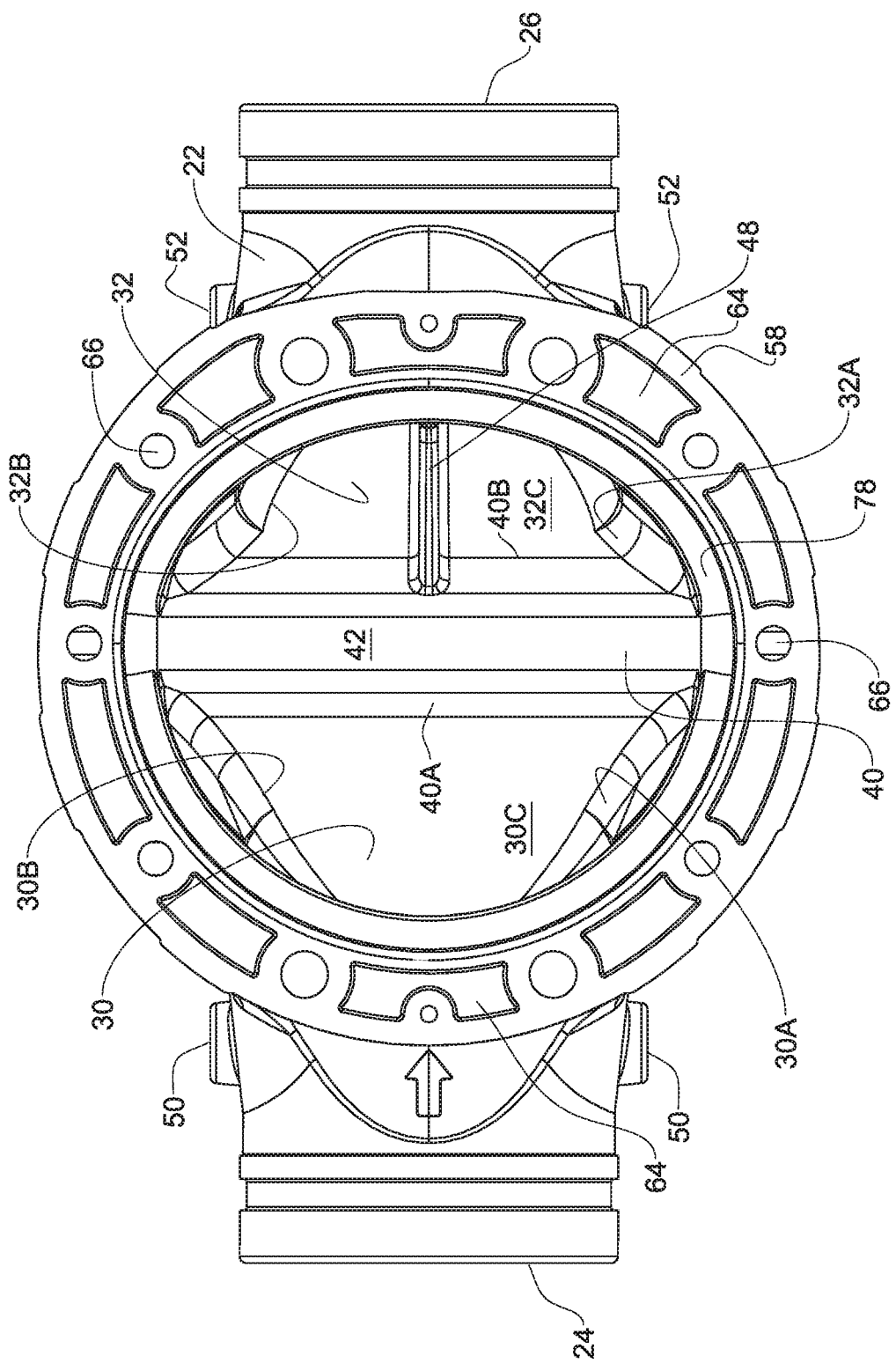
FIG. 3A is a planar top view of the valve body.
Figure 4:
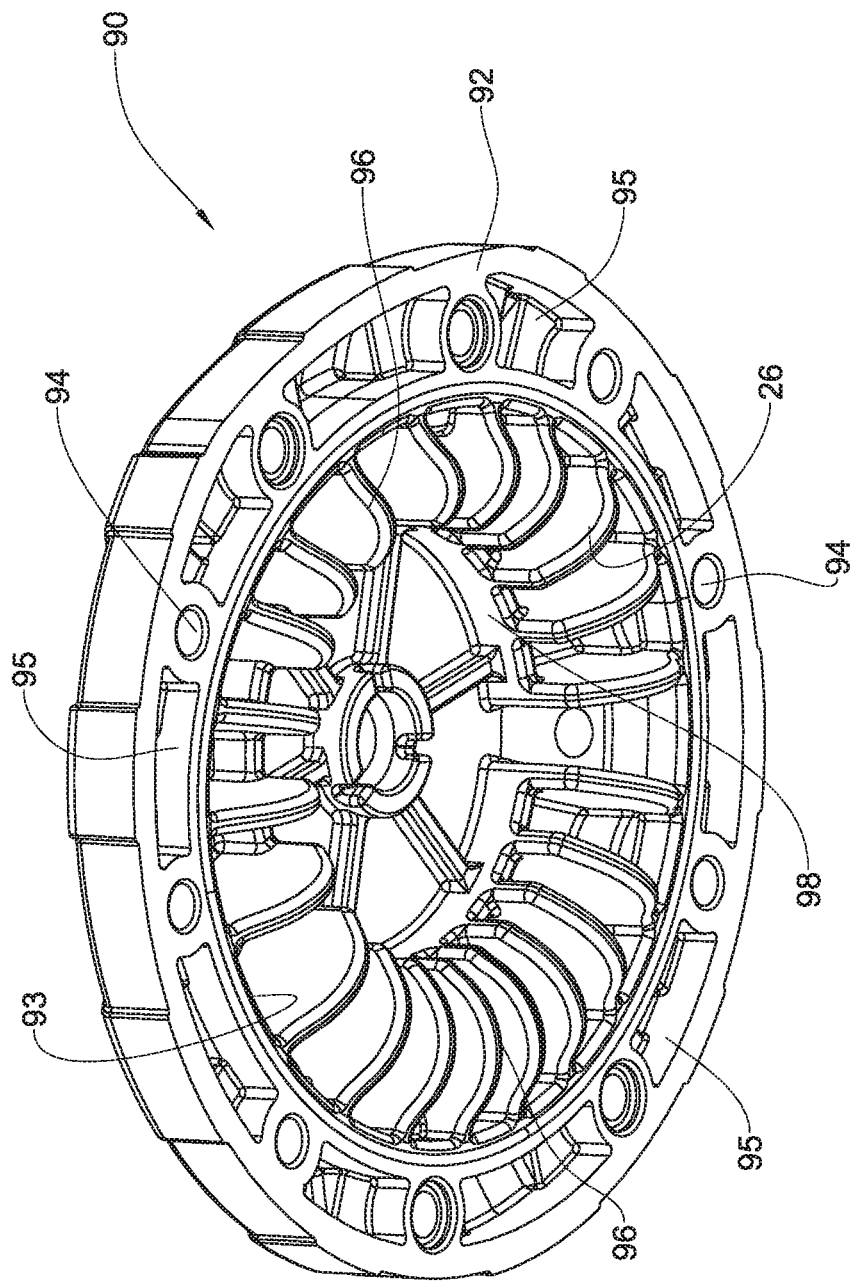
FIG. 4 is a bottom perspective view of the valve cover.

A cover of the valve body, generally designated 90 (best seen in FIGS. 2 and 4), has at a bottom face thereof an annular diaphragm seat 92, corresponding in size and shape with annular diaphragm seat 58 of the valve body 22 and is configured with an annular sealing rib 93, and through going apertures 94 in register with bolt openings 66 of the body 22 for coupling to the body using bolts 97.

Figure 6A:
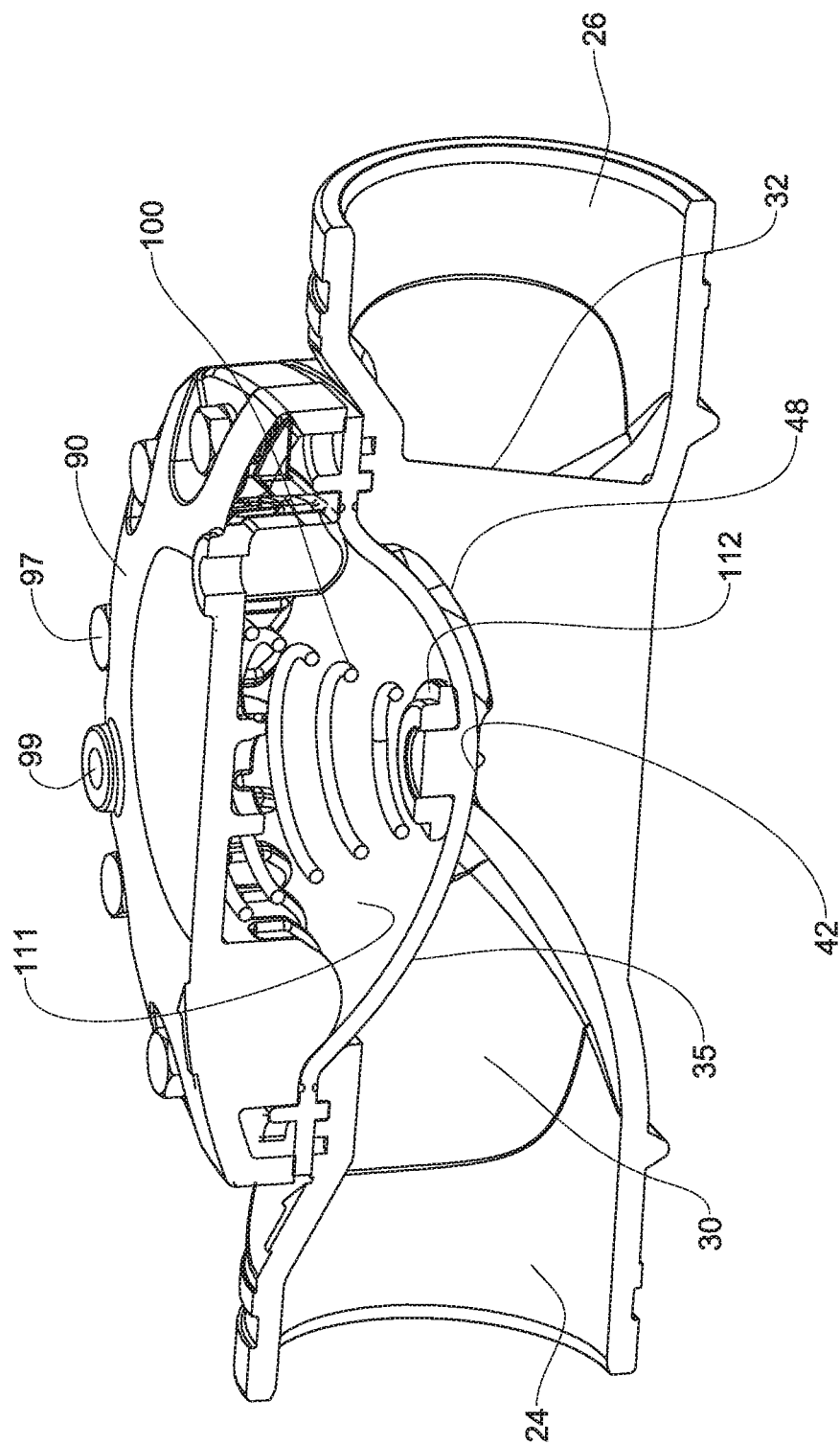
FIG. 6A is a vertical perspective section along line B-B in FIG. 1, at a closed/sealed position of the valve.
Figure 6B:
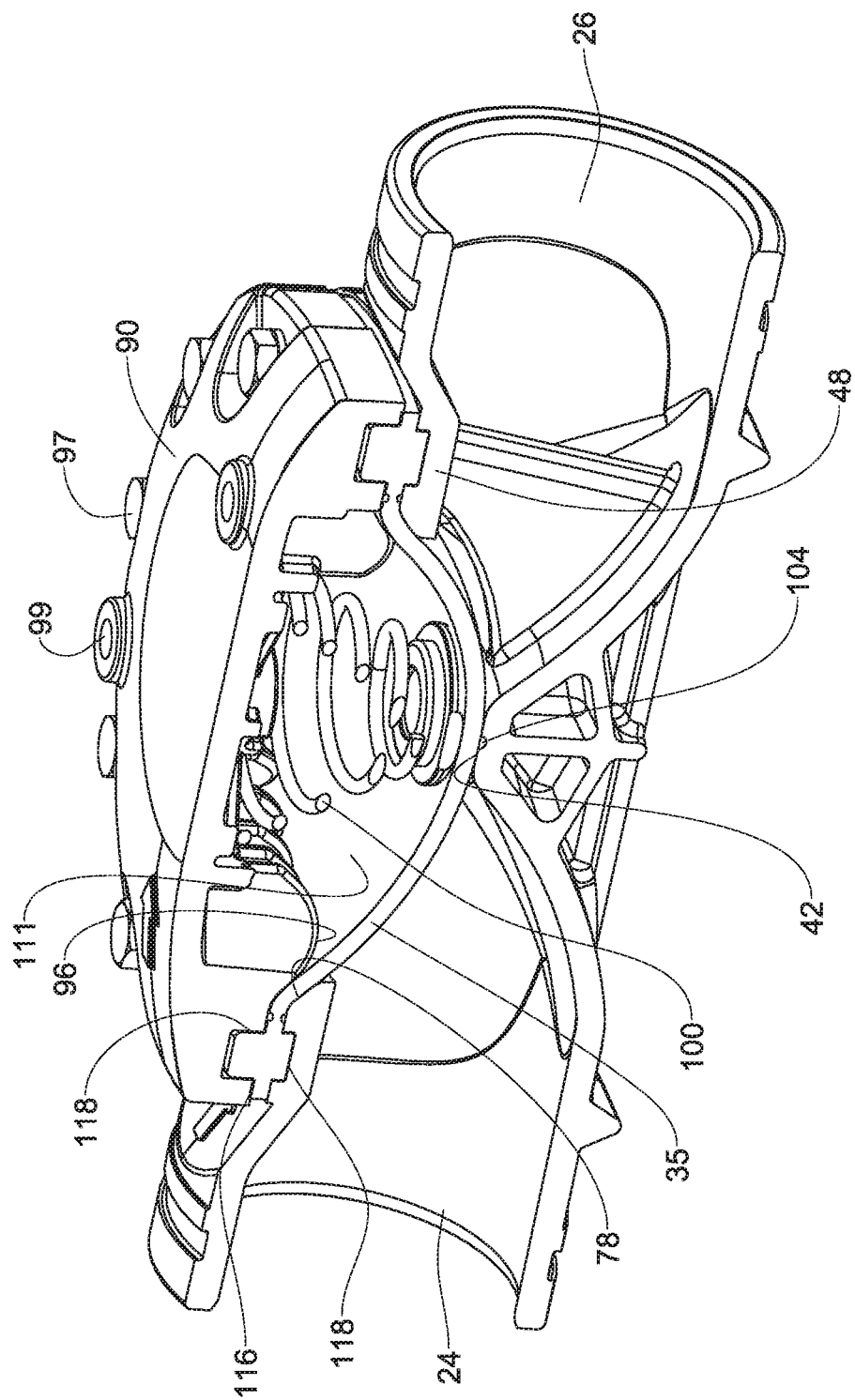
FIG. 6B is a vertical perspective section along line C-C in FIG. 1, at a closed/sealed position of the valve.
Figure 6C:
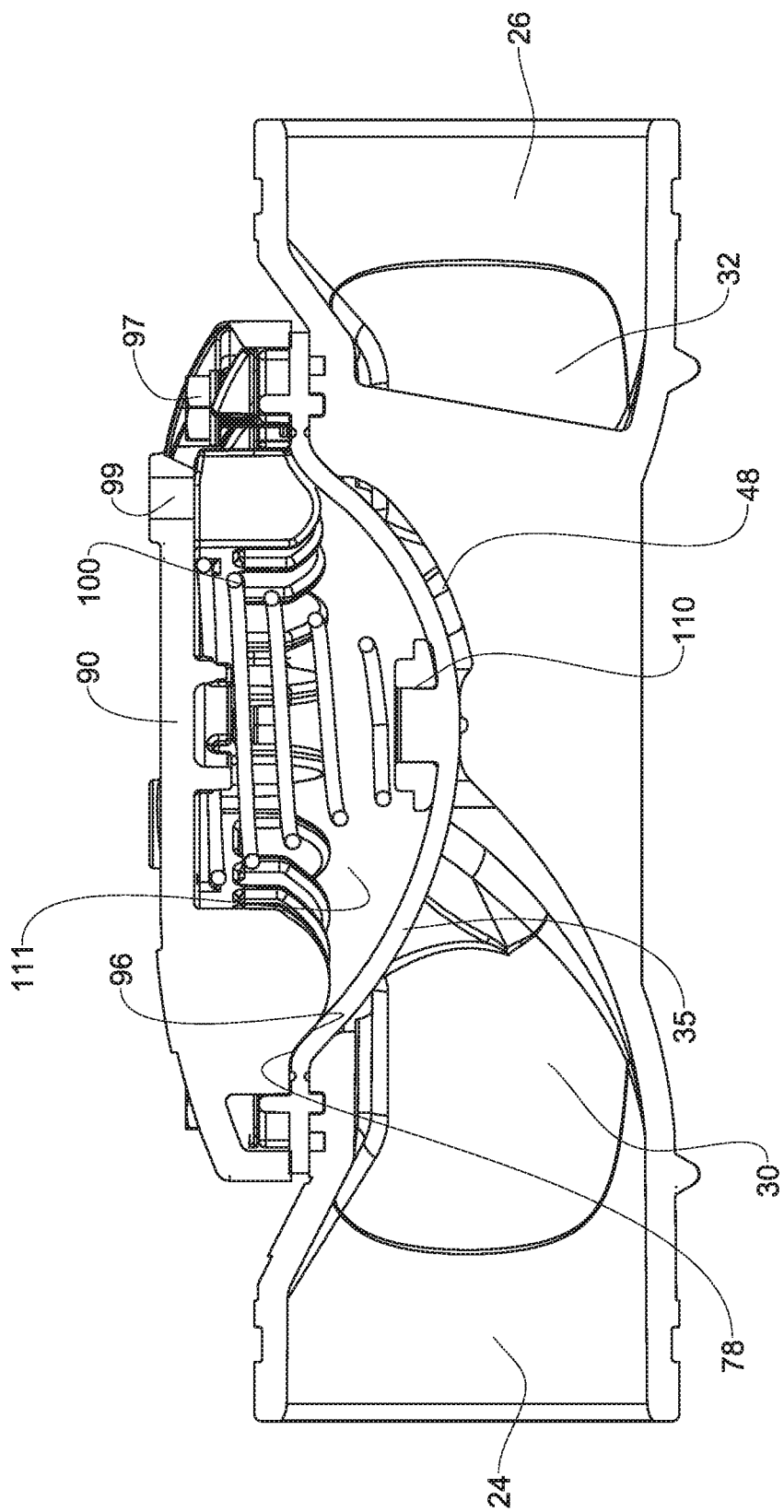
FIG. 6C is a vertical section planar view of the valve at a closed/sealed position of the valve.
Figure 7A:
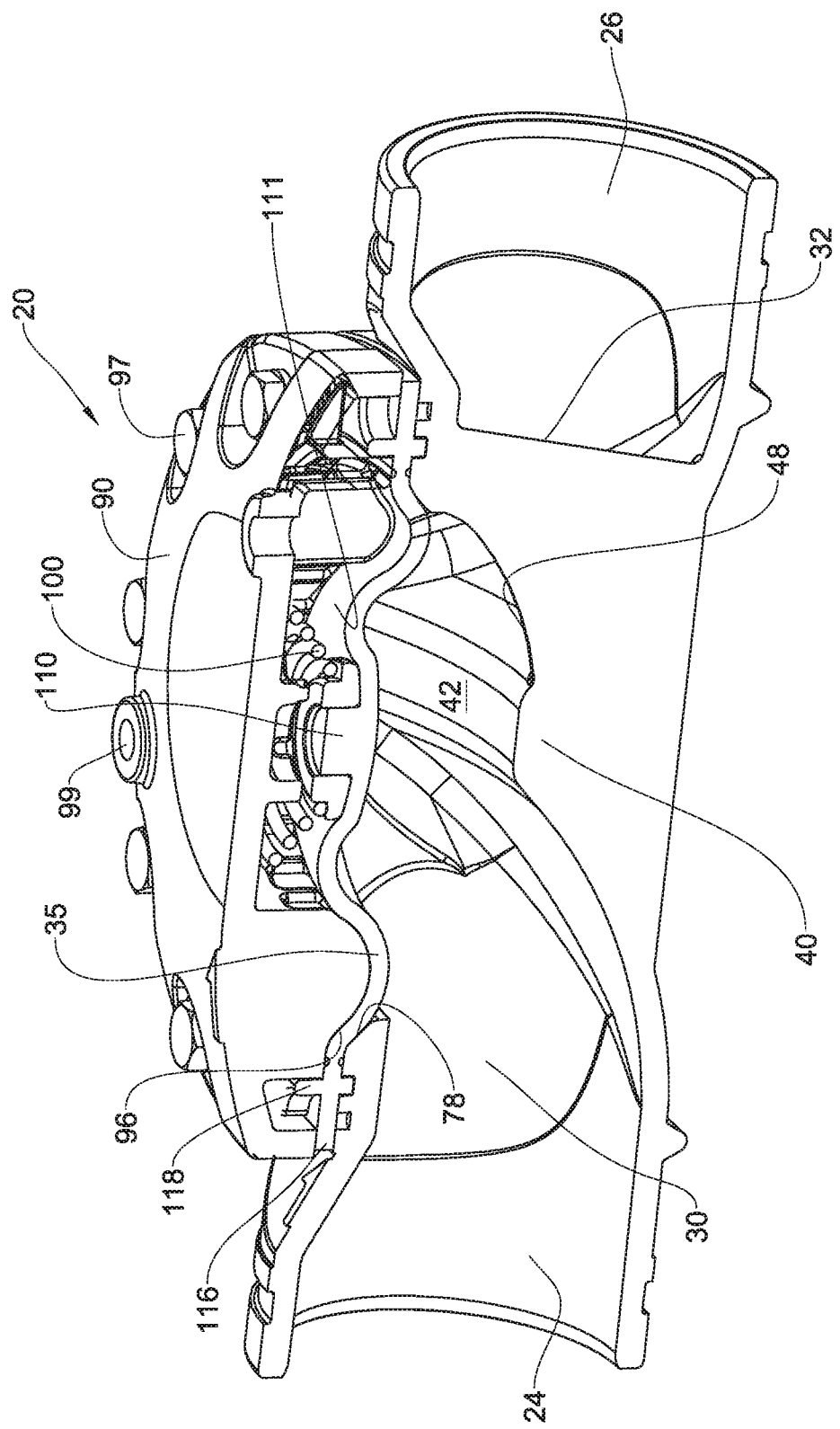
FIG. 7A is a vertical perspective section along line B-B in FIG. 1, at an open/unsealed position of the valve.
Figure 7B:
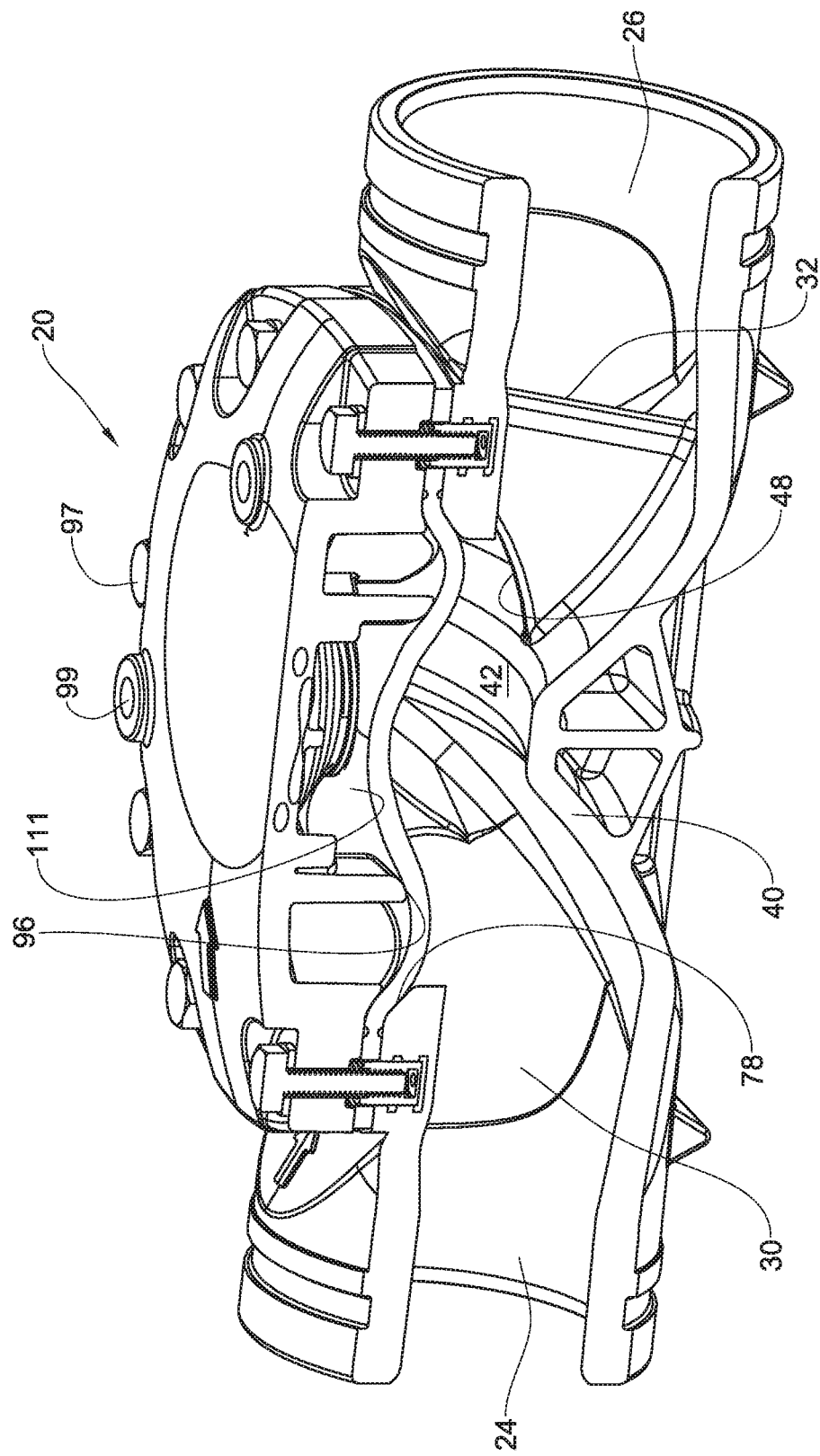
FIG. 7B is a vertical perspective section along line C-C in FIG. 1, at an open/unsealed position of the valve.
Figure 7C:
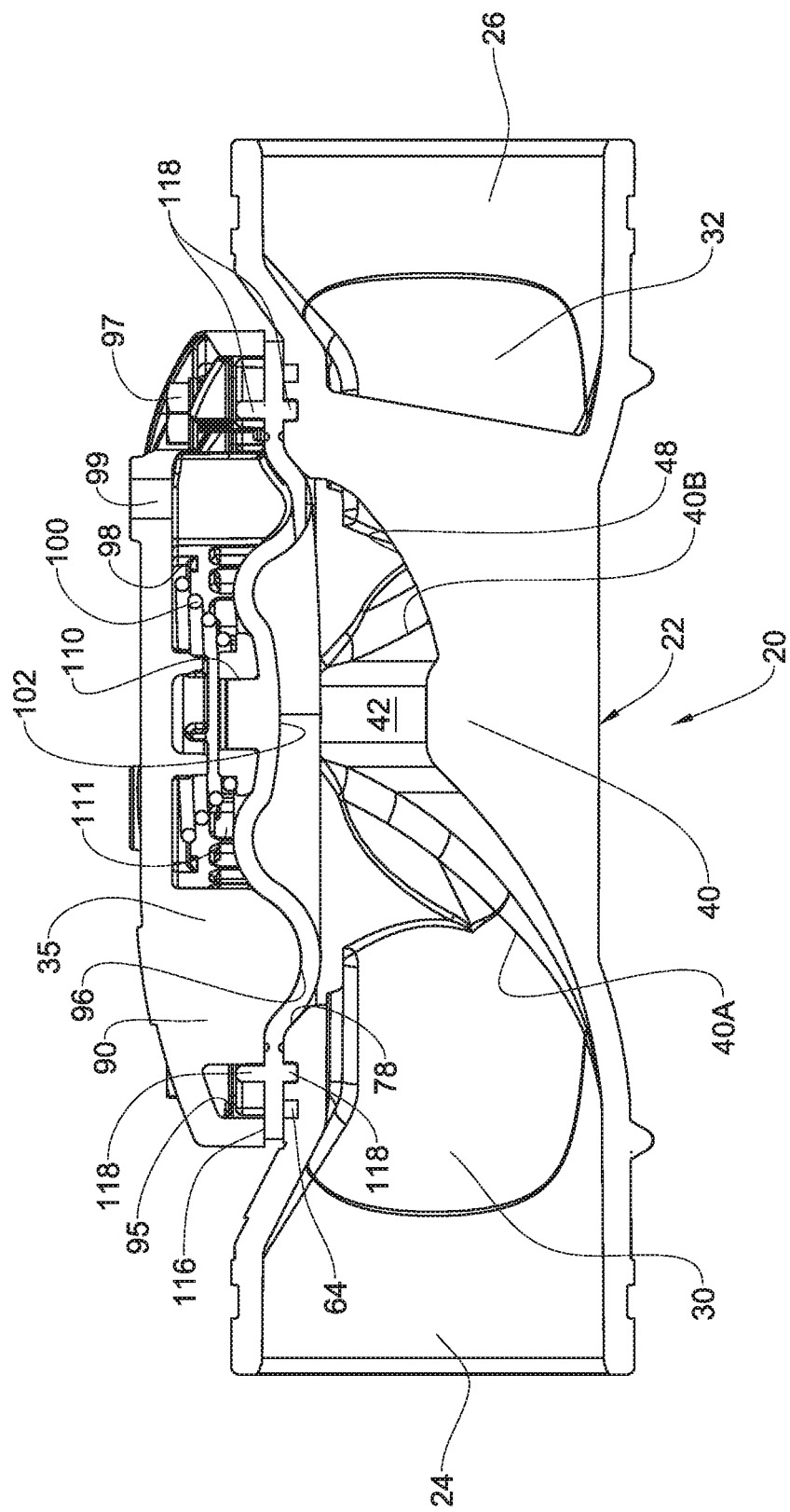
FIG. 7C is a vertical section planar view of the valve at an open/unsealed position of the valve.

The diaphragm seat 92 is further configured with a plurality of differently shaped radial depressions 95 (the purpose of which will be realized hereinafter) and at bottom face of the cover is further configured with a diaphragm bearing surface in the form of a plurality of radially extending, neighboring ribs 96, provided for preventing the flexible diaphragm 35 from excessive deforming (i.e., limiting diaphragm opening to optimal flow), as will shortly be explained. Ribs 96 have a roll also in clamping the flexible diaphragm 35 and as can be seen the ribs 96 are shaped in conformity with the shape of the annular funnel-like surface 78 of body 22 and at an assembled position (FIGS. 6 and 7) are only slightly spaced apart therefrom, for additional clamping the flexible diaphragm 35 and deforming a portion of the diaphragm downwards, namely against funnel-like surface 78.

The cover 90 is further configured at a bottom face thereof with a diaphragm biasing member seat, namely seat 98 (FIG. 4) for supporting and positioning a coiled spring 100 biasing the flexible diaphragm 35 into its normally sealed position.

The cover 90 is also configured with at least one control signal inlet port in the form of a nipple coupling 99, (three in the illustrated example, such that at assembling the valve 20 a nipple (e.g., nipple 101 seen in FIGS. 8A and 8B) can be fitted at a top most location of the cover, at the event that it is not leveled).

Turning now to the diaphragm 35 (independently shown in FIGS. 5A to 5C), it is made of a resilient material and has a generally round shape, though non-symmetrical along a flow axis thereof, having a first axis X and a second axis Y, the first axis X corresponding with the flow axis of the valve, and the second axis Y corresponding with a sealing axis, wherein $X_1 > X_2$. According to the particular illustrated example $Y_1 = Y_2 \geq X_1 > X_2$. However according to another example $Y_1 = Y_2 > X_1 > X_2$.

The arrangement is such that when the diaphragm 35 is mounted within the valve body 22, the shorter, first segment $S_1$ and the second segment $S_2$ (FIG. 5B) extend over the outlet chamber 32, and third segment $S_3$ and fourth segment $S_4$ extend over the inlet chamber 30.

The flexible diaphragm 35 has an inverted domed-shape substantially following the shape of the concave sealing surface 42 of sealing bridge 40, with its apex extending at the intersection of axes X and Y. In the illustrated example, a bottom face 102 of the diaphragm is configured with a longitudinal sealing rib 104 (extending along axis Y) for sealing engagement with the sealing surface 42 of the valve body 22. A spring support 110 projects upwards at the apex from a top surface 104 of the diaphragm, and is configured for supporting a spring plate 112 (FIG. 2) for retaining the a narrow base of the inverted cone-like coiled spring 100)

A peripheral flanging portion 116 of the flexible diaphragm 35 is configured with a plurality of projections 118 extending from both its top face 104 and bottom face 102, said projections 118 being of different shapes and in the present example having a radial orientation, however as a mere example. The projections 118 match in shape the depressions 64 at the annular diaphragm seat 58 of body 22, and depressions 95 formed at the diaphragm seat 92 of the cover 90, together serving for retaining the flexible diaphragm 35 in position also under significant hydraulic pressure. The bores 120 are disposed in register with bolt openings 94 of the cover 90 and bolt openings 66 of the body 22, whereby fastening the series of bolts 97 applies clamping pressure over the peripheral portion 116 of the diaphragm, retaining it place also at the event of significant forces/pressure applied thereover.

A control chamber 111 extends between the body cover 90 and a top face 104 of the diaphragm 35, with nipple openings 99 extending into said control chamber, occasionally, the nipple opening is coupled through a three way coupler (not shown) having one control line extending from an inlet port e.g., through control inlet ports 50, a draining line extending to atmosphere or to the outlet port through draining ports 52 and a control line being in fluid communication with the control chamber 111 through nipple openings 99.

In operation, the valve 20 is at a closed/sealed position (FIGS. 6A, 6B, and 6C) wherein the spring 100 applies biasing force over the diaphragm 35, and a pressurized fluid or pressurized air is introduced into the control chamber 111 (through opening 99), wherein the diaphragm assumes its sealed position, with the longitudinal rib 104 sealingly bearing over the sealing surface 42 of the concave sealing bridge 40. At this position fluid flow between the inlet port 24 and the outlet port 26 is barred. When however it is required to open the valve 20 so as to facilitate fluid flow from the inlet through the outlet port (FIGS. 7A, 7B, and 7C), the control chamber 111 is drained to the atmosphere or through draining ports 52 into the outlet port 26 and pressurizing the control chamber 111 stopped, whereby the diaphragm 35 is allowed to overcome the biasing effect of the coiled spring 100 and deform so as to disengage from sealing engagement over the sealing bridge 20, now facilitating flow from the inlet port 24 towards the outlet port 26.

The arrangement is such that the smaller section area of the outlet chamber, as compared with the inlet chamber, and the corresponding smaller section area of the sealing diaphragm extending over the outlet chamber as compared with the section area of the sealing diaphragm extending over the inlet chamber results in preventing or substantially eliminating drifting of the diaphragm into the outlet chamber. In addition, another result is that the valve is more sensitive to operation under low pressure, i.e., will displace into its open position also at lower pressure as compared with a diaphragm having symmetry over its flow axis. Furthermore, a result of the asymmetric configuration is faster responding of the diaphragm and shifting between open/closed position as a result of the small control chamber volume. This arrangement provides that the non-symmetric diaphragm drifts less than a corresponding symmetric diaphragm (circular), whereby the valve has improved performance for opening also at low operating pressure As compared to a diaphragm at which $Y > X_1 = X_2$, e.g., as the case is using an oval diaphragm.

Figure 8A:
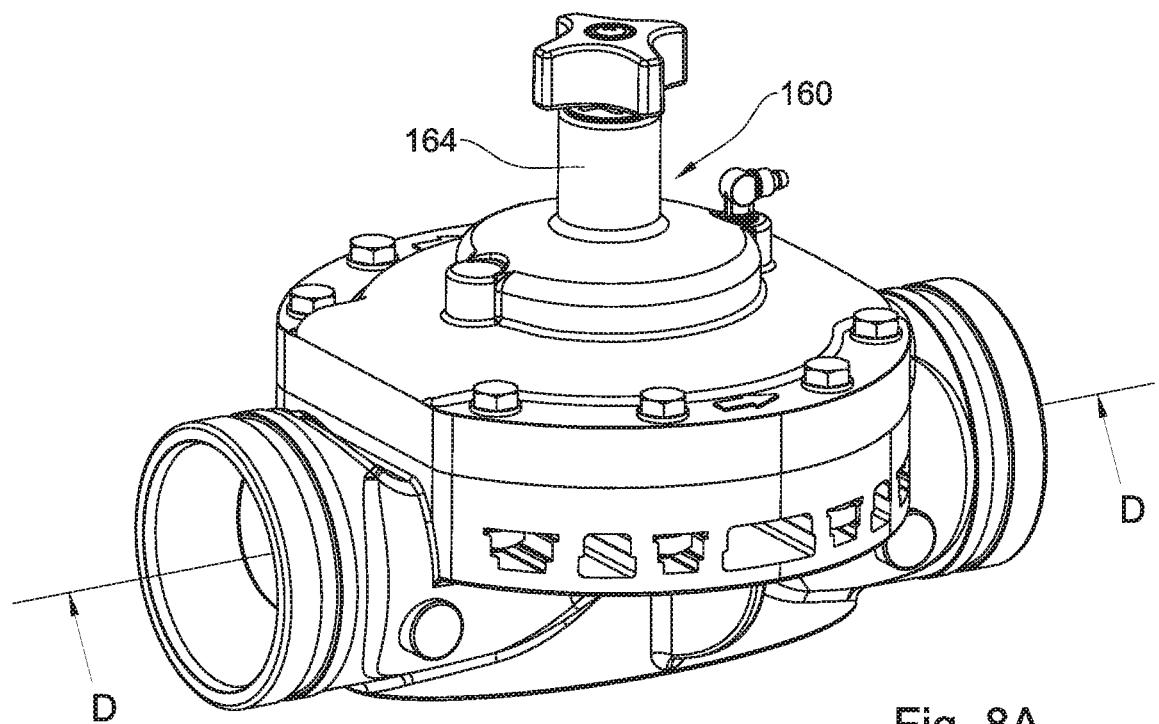
FIG. 8A is a perspective view of a valve according to another example of the disclosure, configured with a diaphragm displacement restricting mechanism.
Figure 8B:
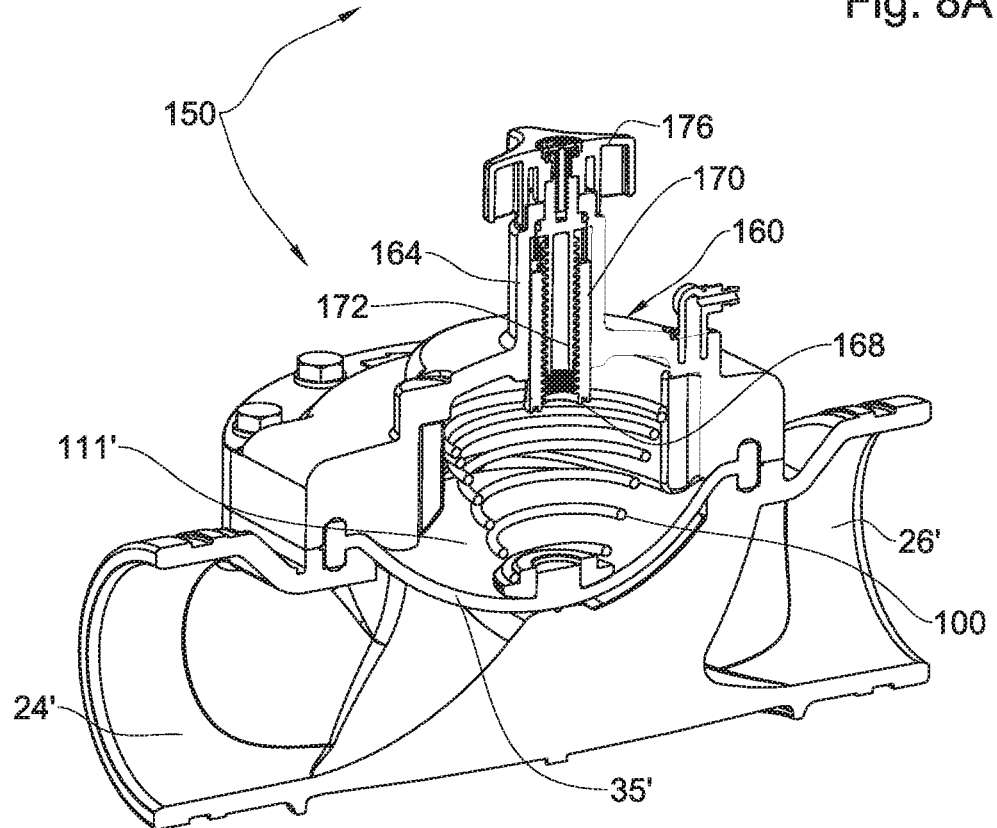
FIG. 8B is a section taken along section C-C in FIG. 8A, the valve at its closed position.

Turning now to FIGS. 8A and 8B there is illustrated a valve generally designated 150, being substantially similar to the valve 20 disclosed hereinabove, however with the provision of a diaphragm biasing restricting mechanism generally designated 160. For sake of clarity, like elements as in FIGS. 1 to 7 are designated with same reference numbers however with an indication.

The diaphragm biasing restricting mechanism 160 comprises a boss extending from the top of cover 90 with a plunger end 168 disposed at a bottom of an internally threaded sleeve 170. Screw coupled within the sleeve 170 there is a threaded axle 172 fixed at a bottom of a manually operated handle 176 projecting from the boss 164, at a sealed configuration. Rotation of the handle 176 results in axial displacement of the sleeve 170 until plunger end 168 bears over the spring support 110 of the diaphragm 35', restricting deformation thereof.

Displacing the plunger end 168 downwards, prevents displacement of the diaphragm 35' into its fully open position (as in FIGS. 7A, 7B and 7C), to thereby restrict fluid flow through the valve and reduce fluid flow pressure.

Figure 9A:
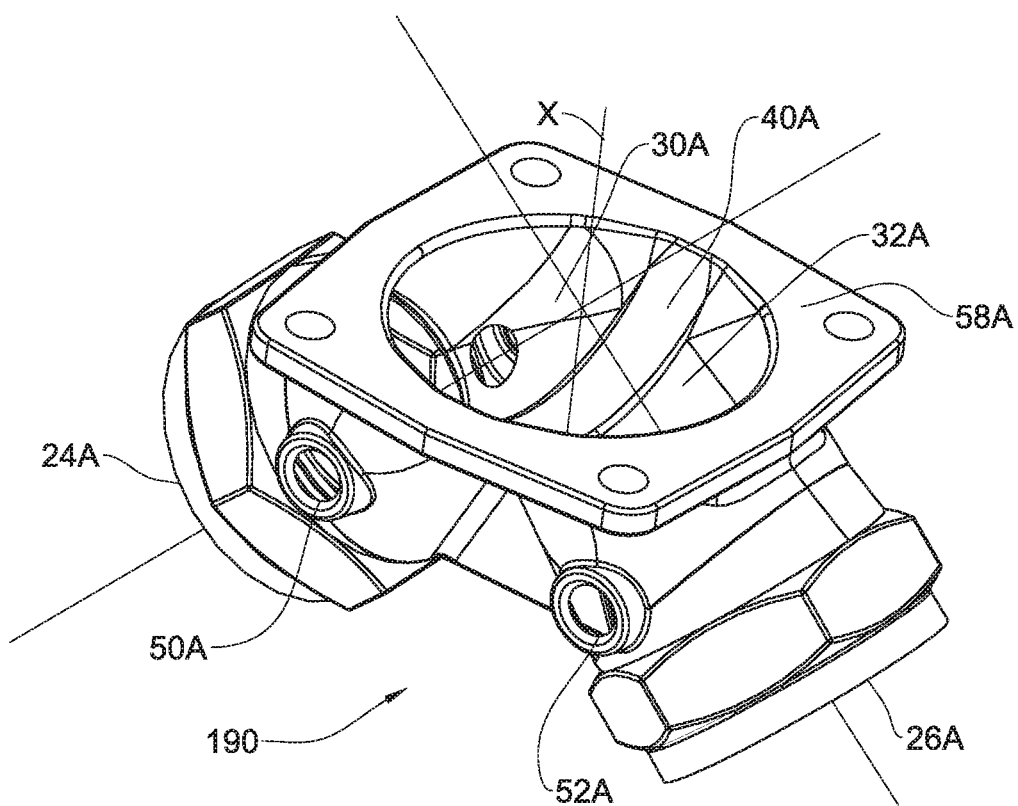
FIGS. 9A and 9B are directed to an example of the disclosure wherein the inlet port and the outlet port are non-coaxial.
Figure 9B:
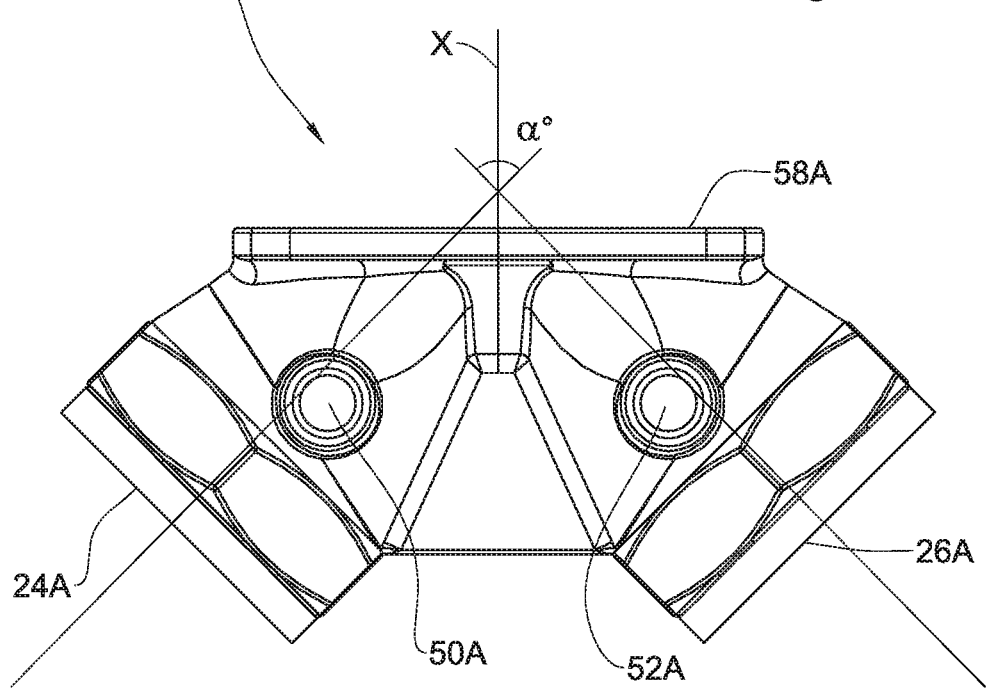
Figure 10A:
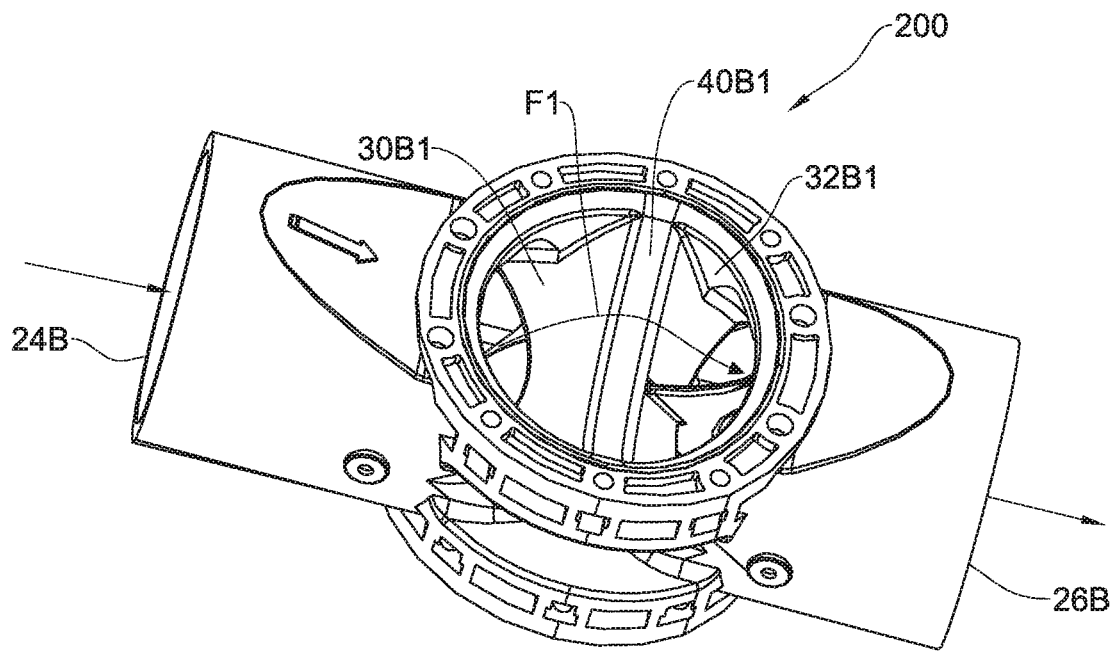
FIGS. 10A to 10E are directed to yet an example of a double operated diaphragm valve, according to the present disclosure.
Figure 10B:
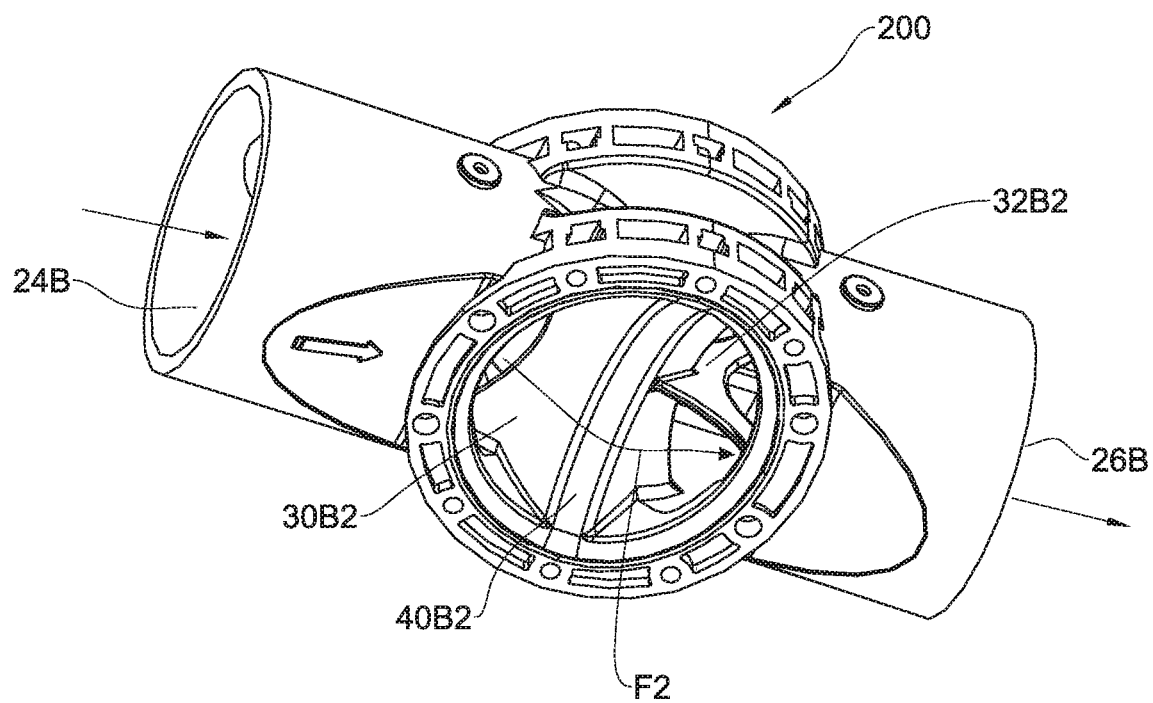
Figure 10C:
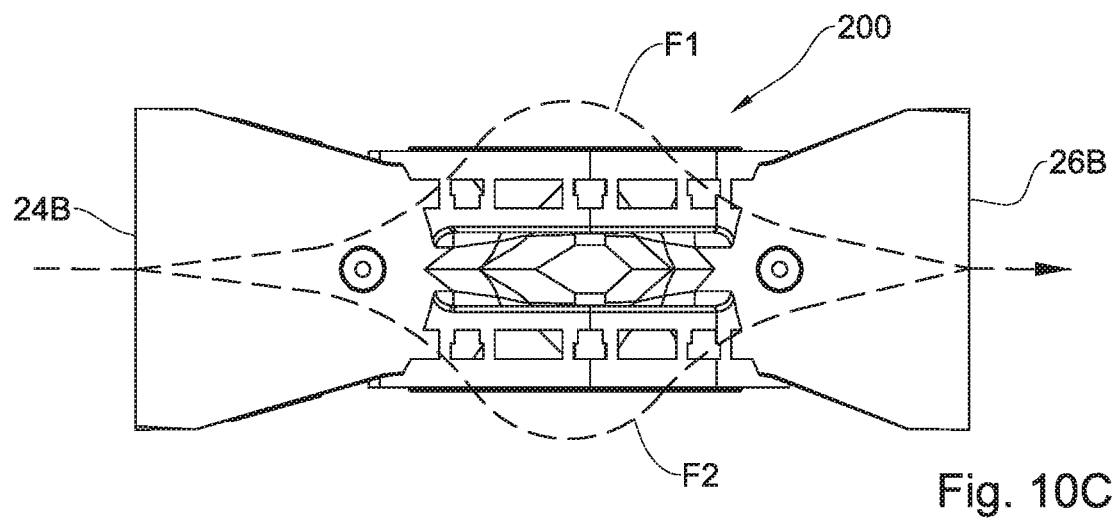
Figure 10D:
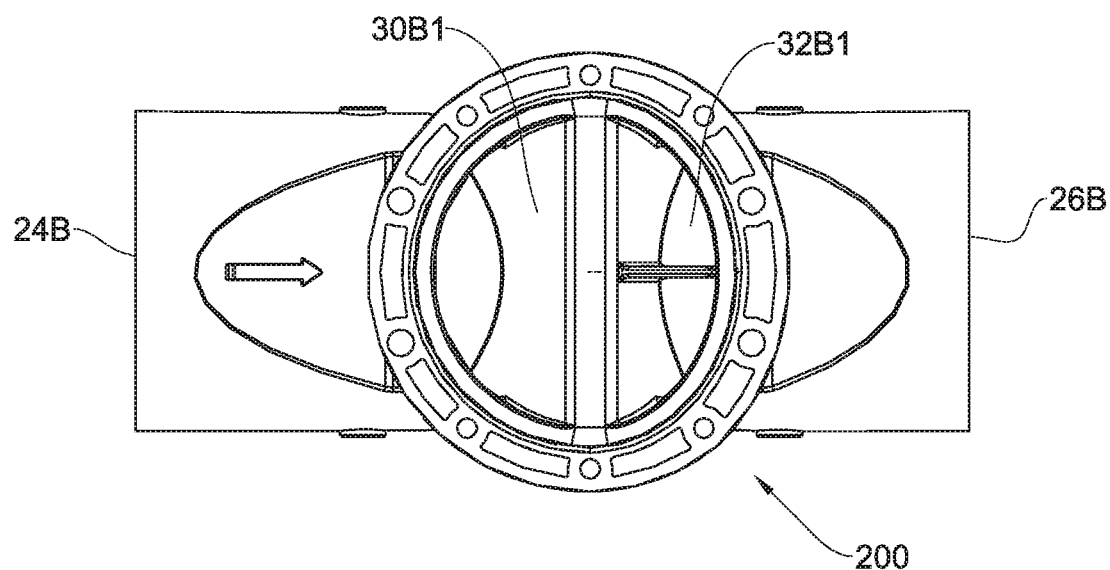
Figure 10E:
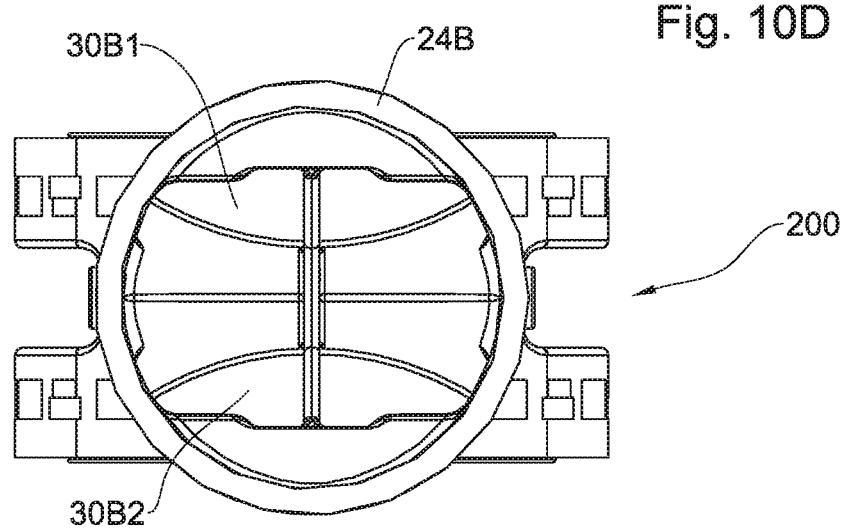

Turning to FIGS. 9A and 9B there is illustrated a valve body generally designated 190, for use with a fluid control valve according to the disclosure. For sake of clarity, like elements as in FIGS. 1 to 7 are designated with same reference numbers however indicated with an 'A' indication.

In the drawings it is seen that inlet port 24A and the outlet port 26A are disposed at an angle α with respect to one another (best seen in FIG. 9B). In the illustrated example the inlet port 24A and the outlet port 26A coplanar extend over a substantially vertical plane (i.e., a coplanar with a diaphragm axis X). However, according to yet an example (not shown) said plane is substantially a horizontal plane. It is appreciated that the inlet port and the outlet port can extend from the valve body at an equally angled orientation, or they can be each disposed at a different angle with respect to the body housing.

With further reference to FIGS. 10A to 10E there is illustrated a valve body generally designated 200, for use with a double operated diaphragm valve (only the valve body is illustrated herein), wherein for sake of clarity, like elements as in FIGS. 1 to 7 are designated with same reference numbers however indicated with an 'B' indication.

The double diaphragm valve body 200 is configured with an inlet port 24B extending into a common first inlet chamber 30B1 and into a second inlet chamber 30B2, and an outlet port 26B extending from a common first outlet chamber 32B1 and a second outlet chamber 32B2, wherein the first inlet chamber 30B1 and the first outlet chamber 32B1 are partitioned by a first sealing bridge 40B1, and the second inlet chamber 30B2 and the second outlet chamber 32B2 are partitioned by a second sealing bridge 40B2. All other aspects of the housing are substantially similar to those illustrated and discussed hereinabove.

As appreciated, though not illustrated, an assembled double operated diaphragm valve is further configured with a first control chamber accommodating a first flexible sealing diaphragm and a second control chamber accommodating a second flexible sealing diaphragm similar to the disclosure hereinabove. The first diaphragm and second diaphragm are deformable between a sealing position and an open position, wherein at the sealing position they sealingly bear over the respective first sealing bridge 40B1 and the second sealing bridge 40B2, and seal a first flow path F1 extending between the first inlet chamber 30B1 and the first outlet chamber 32B1, and second flow path F2 extending between the second inlet chamber 30B2 and the first outlet chamber 32B2, and at the open opposition said diaphragms are disengaged from the respective first sealing bridge 40B1 and the second sealing bridge 40B2, facilitating fluid flow along the first flow path F1 and the second flow path F2, i.e., between the inlet port 24B and the outlet port 26B.

In the illustrated example the first sealing bridge 40B1 and the second sealing bridge 40B2 are parallel to one another resulting in that the sealing diaphragms (not shown) are coaxially displaceable, however at opposite senses, when displacing into their respective closed or open position. The two diaphragms simultaneously displace into their respective closed or open position.

Those skilled in the art to which this invention pertains will readily appreciate that numerous changes, variations, and modifications can be made without departing from the scope of the presently disclosed subject matter, mutatis mutandis.

The invention claimed is:

1. A fluid control valve, comprising:
   a valve body configured with an inlet port extending into an inlet chamber, and an outlet port extending from an outlet chamber, wherein the inlet chamber and the outlet chamber are partitioned by a sealing bridge;
   a control chamber accommodating a flexible sealing diaphragm deformable between a sealing position in which the sealing diaphragm sealingly bears over the sealing bridge and seals a fluid flow path extending between the inlet chamber and the outlet chamber, and an open position in which fluid flow along the flow path is enabled; and
   wherein an inlet path extending through the inlet chamber along the fluid flow path is longer than an outlet path extending through the outlet chamber along the fluid flow path, wherein the sealing diaphragm is asymmetric with respect to an apex thereof, and a portion of the sealing diaphragm extending from the apex over the inlet path has larger area than a portion of the sealing diaphragm extending from the apex over the outlet path.

2. A fluid control valve according to claim 1, wherein an inlet radii of the sealing diaphragm is longer than an outlet radii of the sealing diaphragm.

3. A fluid control valve according to claim 1, wherein an effective section area of the inlet chamber is greater than an effective section area of the outlet chamber.

4. A fluid control valve according to claim 1, wherein an inside face of a body cover of the valve body is configured with a diaphragm bearing surface for supporting the flexible sealing diaphragm when the sealing diaphragm is in the open position.

5. A fluid control valve according to claim 4, wherein the diaphragm bearing surface of the body cover is formed by a plurality of neighboring ribs.

6. A fluid control valve according to claim 1, wherein the flexible diaphragm is clamped between a diaphragm seat at the valve body and a clamping portion at a body cover of the valve body.

7. A fluid control valve according to claim 1, wherein one or more of the clamping portion of a body cover of the valve body and a diaphragm seat of the valve body and an annular clamping portion of the diaphragm are configured with griping projections with corresponding apertures configured at an opposite mating face.

8. A fluid control valve according to claim 7, wherein the annular clamping portion of the flexible diaphragm is configured with a plurality of projections extending at a top and bottom face thereof, with corresponding griping openings formed at the clamping portion of the body cover and the diaphragm seat of the valve body.

9. A fluid control valve according to claim 1, wherein the sealing bridge is configured with a concave section for sealing engaging with the flexible sealing diaphragm.

10. A fluid control valve according to claim 1, wherein a sealing portion of the sealing bridge is configured with a flat sealing surface.

11. A fluid control valve according to claim 1, wherein sealing portion of the sealing bridge is configured with a projecting rib for sealing engagement with the flexible diaphragm.

12. A fluid control valve according to claim 1, wherein the inlet port and the outlet port are substantially coaxially disposed.

13. A fluid control valve according to claim 1, wherein the outlet chamber is configured with a diaphragm support for preventing drifting of the diaphragm into the outlet chamber.

14. A fluid control valve according to claim 1, wherein the sealing diaphragm is normally biased into the sealed position by a biasing spring member.

15. A fluid control valve according to claim 14, wherein the biasing spring member is mechanically restricted to prevent displacement of the diaphragm into a fully open position, to thereby restrict fluid flow through the valve and reduce fluid flow pressure.

16. A fluid control valve according to claim 14, wherein displacement of the biasing spring member is mechanically restricted by a mechanical restriction mechanism comprising a displacing member configured for bearing at a top portion of the biasing spring member and configured for displacing said top portion of the biasing spring member from a bottom face of a body cover of the valve body.

17. A fluid control valve according to claim 16, wherein the mechanical restriction mechanism comprises a plate element bearing at a top portion of the biasing member, said plate element configured for axial displacement by a bolt member projecting from the body cover.

18. A fluid control valve according to claim 1, wherein the diaphragm seat of the valve body is configured with a funnel-like diaphragm seat portion extending into a top portion of the inlet chamber and outlet chamber, with a corresponding rounded clamping portion at the body cover, whereby the diaphragm is clamped below a clamping flange thereof.

19. A fluid control valve according to claim 1, wherein a length measured along the sealing bridge is substantially similar to a length of the inlet chamber.

20. A fluid control valve according to claim 1, wherein the inlet port extends into a first inlet chamber and into a second inlet chamber, the outlet port extends from a first outlet chamber and a second outlet chamber, wherein the first inlet chamber and the first outlet chamber are partitioned by a first sealing bridge, and the second inlet chamber and the second outlet chamber are partitioned by a second sealing bridge, a first control chamber accommodating a first flexible sealing diaphragm and a second control chamber accommodating a second flexible sealing diaphragm, said first diaphragm and second diaphragm being deformable between a sealing position in which they sealingly bear over a respective sealing bridge and seal a fluid flow path extending between the respective inlet chamber and the outlet chamber, and an open position in which fluid flow along the flow path is enabled; and wherein an inlet path along the fluid flow path is longer than an outlet path along the fluid flow path.

* * * * *